(12) United States Patent
Bickle et al.

(10) Patent No.: US 8,430,571 B2
(45) Date of Patent: Apr. 30, 2013

(54) SLIDING BEARING SHELL FOR ENGINE APPLICATIONS

(75) Inventors: Wolfgang Bickle, Reilingen (DE); Werner Schubert, Wiesloch (DE); Frank Haupert, Stelzenberg (DE); Gunter Buerkle, Benningen (DE)

(73) Assignee: KS Gleitlager GmbH, St. Leon-Rot (DE)

( * ) Notice: Subject to any disclaimer, the term of this patent is extended or adjusted under 35 U.S.C. 154(b) by 879 days.

(21) Appl. No.: 11/921,083

(22) PCT Filed: Jun. 1, 2006

(86) PCT No.: PCT/EP2006/005229
§ 371 (c)(1),
(2), (4) Date: Mar. 31, 2010

(87) PCT Pub. No.: WO2006/128702
PCT Pub. Date: Dec. 7, 2006

(65) Prior Publication Data
US 2010/0290727 A1    Nov. 18, 2010

(30) Foreign Application Priority Data
Jun. 2, 2005   (DE) .................. 10 2005 026 665

(51) Int. Cl.
*F16C 9/02*      (2006.01)
*F16C 17/00*     (2006.01)
*F16C 33/00*     (2006.01)
*B32B 15/08*     (2006.01)

(52) U.S. Cl.
USPC ........... 384/430; 384/276; 384/907; 384/913; 384/625; 428/460

(58) Field of Classification Search .............. 384/129, 384/276, 429–430, 623, 907, 625, 913; 428/144, 428/357, 460
See application file for complete search history.

(56) References Cited

U.S. PATENT DOCUMENTS

| 4,847,135 | A | * | 7/1989 | Braus et al. ................... 384/907 |
| 5,300,366 | A | * | 4/1994 | Nakamaru et al. ............ 428/549 |
| 6,655,842 | B2 | * | 12/2003 | Kanayama et al. ........... 384/276 |
| 7,056,589 | B2 | * | 6/2006 | Haupert et al. ................ 428/460 |
| 7,056,590 | B2 | * | 6/2006 | Bickle et al. .................. 428/460 |
| 2004/0259741 | A1 | | 12/2004 | Sugioka |
| 2008/0194437 | A1 | * | 8/2008 | Murase et al. ................ 508/108 |

FOREIGN PATENT DOCUMENTS

| DE | 102 26 264 | | 12/2003 |
| EP | 218274 | A1 * | 4/1987 |
| EP | 223268 | A1 * | 5/1987 |
| EP | 0 984 182 | | 3/2000 |
| GB | 2 384 033 | | 7/2003 |
| WO | WO 03/103955 | | 12/2003 |

\* cited by examiner

*Primary Examiner* — Marcus Charles
(74) *Attorney, Agent, or Firm* — Paul Vincent

(57) ABSTRACT

A sliding bearing for engine applications, in particular a sliding bearing shell for the mounting of the crankshaft or the camshaft or for use as a connecting-rod bearing shell, has a metallic supporting layer and, applied on top of that, a bearing metal layer of aluminum alloy, copper alloy or brass, the bearing metal layer having an 8-20 μm thick PTFB-free PAI-based coating applied on top of it, the PAI-based coating having 5-15% by weight zinc sulphide, 5-15% by weight graphite and 5-15% by weight $TiO_2$ with the ratio of zinc sulphide and graphite respectively to $TiO_2$ in terms of their percentage by weight being 0.6-1.4 and the zinc sulphide and $TiO_2$ being present in a particle size of $\leq 0.7$ μm.

11 Claims, No Drawings

SLIDING BEARING SHELL FOR ENGINE APPLICATIONS

This application is the national stage of PCT/EP2006/005229 filed on Jun. 1, 2006 and also claims Paris Convention priority to DE 10 2005 026 665.7 filed on Jun. 2, 2005.

BACKGROUND OF THE INVENTION

The invention relates to a sliding bearing for engine applications, in particular, a sliding bearing shell for the mounting of the crankshaft or the camshaft or for use as a connecting-rod bearing shell, with a metallic supporting layer and, applied on top of that, a bearing metal layer of aluminum alloy, copper alloy, or brass.

It is already known that a thin run-in or emergency plastics-based layer can be applied to bearing metal layers for sliding bearings for engine applications, that is, a layer made of a matrix-forming binding agent and solid lubricants held therein that improve the sliding properties.

WO 2004/113749 A1 discloses and describes a matrix comprising modified epoxy resin, i.e. a mixture of epoxy resin and phenolic resin, or a polyimide-amide resin with a greater proportion of polyimide, the layer comprising 15 to 30% by volume of a metallic powder, 1 to 15% by volume of a fluoropolymer, 0.5 to 20% by volume of a ceramic powder, and 2 to 15% by volume of silica. PTFE is the fluoropolymer used by preference.

GB-A-2 384 033 also discloses a bearing shell for a piston cross-head bearing of a marine engine with an approximately 20-µm thick coating. The coating comprises a synthetic resin from the group polyamide-imide, polybenzimidazole, polyamide, epoxy or phenolic resin. As the solid lubricant, at least a component of the group PTFE, $MoS_2$, graphite, boron nitride, polyethersulfon is stated. As hard particles, at least a substance from the group of metal oxides (such as $TiO_2$, $Al_2O_3$, etc.), of carbides (such as WC, $MO_2C$, SiC etc.), of nitrides (such as $Si_3N_4$ etc.) are stated.

Finally, metal powder such as Cu, Ag, Zn etc. is disclosed. Most of the examples with a PAI-based coating contain PTFE. A single PTFE-free PAI-based coating compound contains 40% by volume of $MOS_2$ and 1% by volume of $TiO_2$. A further PTFE-free variant is not PAI-based but PBI-based and contains 3% by volume of SiC and 40% by volume of graphite.

EP-A-0 984 182 discloses a sliding bearing for engine applications of the said type with a paint coating based on polyimide, polyamide-imide, epoxy or phenolic resin with 55 to 90% by weight of $MOS_2$. A confusingly large quantity of further additives is also mentioned, including zinc sulfide. Its proportion is 0.5 to 10% by weight, but preferably only 1 to 5% by weight, and in total no more than 10% by weight. The particle size of the additives is <5 µm, in particular, <2 µm.

The object of this invention is to improve the run-in and emergency performance of sliding bearings for engine applications, particularly to improve the semi-fluid friction where conditions are regularly critical. Semi-fluid friction is a condition that can arise on starting or possibly (temporarily) under high loads during operation when the sliding elements are not separated by a continuous film of lubricant (hydrodynamic state). This condition particularly results in wear that reduces the service life of the sliding bearing. In the case of thin run-in and emergency layers especially, there is the problem of the adherence of the thin surface coating to the bearing metal layer, which is essential for the functioning of the sliding bearing.

SUMMARY OF THE INVENTION

This objective is inventively solved in a sliding bearing of the above kind by the bearing metal layer having an 8-to 20-µm thick PTFE-free PAI-based (polyamide-imide) coating applied on top of it, comprising 5 to 15% by weight of zinc sulfide, 5 to 15% by weight of graphite and 5 to 15% by weight of $TiO_2$, and the ratio of zinc sulfide and graphite respectively in relation to $TiO_2$ in terms of their percentage by weight being 0.6 to 1.4 and the zinc sulfide and $TiO_2$ being present in a particle size of $\leq 0.7$ µm.

It was inventively ascertained that PAI-based (polyamide-imide) PTFE, whose tribological properties in a coating are proven, especially in thin coatings, makes adherence to a bearing metal layer more difficult and that a PTFE-free coating, even it is very thin, adheres considerably better to a bearing metal layer even under a heavy load. Moreover, the addition of zinc sulfide, graphite and titanium dioxide has proven excellent in the area under load in interaction with PAI. Zinc sulfide is a good solid lubricant that is insensitive to dryness. The graphite, which is more sensitive in this respect, exhibits good heat conduction and is able to dissipate the friction heat toward the bearing metal layer and the metallic supporting layer. Titanium dioxide, on the other hand, provides the necessary wear resistance. These components therefore provide a suitable system from the tribological point of view even under semi-fluid friction conditions (high load, friction heat, dryness).

DESCRIPTION OF THE PREFERRED EMBODIMENT

It has proven advantageous if zinc sulfide, graphite and $TiO_2$ are each present in proportions of 7 to 13% by weight. It also proves an advantage that the proportion by weight of zinc sulfide and of graphite to $TiO_2$ in each case is between 0.6 and 1.4, in particular between 0.7 and 1.3. In the preferred case, provision in the coating of the same percentage quantities by weight of zinc sulfide, graphite and $TiO_2$ is suggested.

It has proven to be advantageous with respect to good adherence to the bearing metal layer if the coating is free of fluoropolymers.

It is also advantageous that PAI is easily soluble, for example in NMP (N-Methyl-2-pyrrolidon, ratio of approximately 1:1), so that the coating can be applied as a solution, in particular, sprayed on.

Zinc sulfide and titanium dioxide are preferably present as very fine particles because this results in a very "dense" homogeneous distribution of these particles in the PAI matrix. For example, they have a D50 value of the particle size between 200 nm and 500 nm. The D50 value of the particle size denotes a particle size, at which 50% by weight of the substance in question has a larger particle size and 50% by weight has a smaller particle size.

Moreover, it is advantageous with respect to both the load capability as well as to the ability to dissipate friction heat, when the coating includes an additive of up to 10% by weight of carbon fibers or aramide fibers.

The coating preferably has a thickness of 10 to 15 µm.

This invention does not preclude that the coating may contain, in addition to PAI as the matrix-forming plastic component of the coating, one or more further matrix-forming plastics. However, their proportion should not be more than 20% by weight and, in particular, not more than 10% by weight of the proportion of PAI in the coating. Preferably the matrix is formed 100% from PAI. It is more advantageous if the coating consists of the components stated in the independent claim and possibly with carbon fibers or aramide fibers.

We claim:

1. A sliding bearing for engine applications, the sliding bearing comprising:
   a metallic supporting layer;
   a bearing metal layer made from one of an aluminum alloy, a copper alloy and brass disposed on said metallic supporting layer; and
   an 8- to 20-μm thick, PTFE-free, PAI-based coating disposed on said bearing metal layer, said PAI-based coating having 5 to 15% by weight of zinc sulfide, 5 to 15% by weight of graphite and 5 to 15% by weight of $TiO_2$, wherein a ratio of zinc sulfide to $TiO_2$ and a ratio of graphite to $TiO_2$ in terms of percentage by weight are each in a range of 0.6 to 1.4, the zinc sulfide and $TiO_2$ each having a particle size of $\leq 0.7$ μm.

2. The sliding bearing of claim 1, wherein said zinc sulfide, graphite and $TiO_2$ are each present in a proportion of 7 to 13% by weight.

3. The sliding bearing of claim 1, wherein proportions by weight of zinc sulfide to $TiO_2$ and of graphite to $TiO_2$ are each between 0.7 and 1.3.

4. The sliding bearing of claim 1, wherein said coating is free of fluoropolymers.

5. The sliding bearing of claim 1, wherein said coating is applied as a solution with dissolved PAI.

6. The sliding bearing of claim 5, wherein said coating is sprayed on.

7. The sliding bearing of claim 1, wherein said zinc sulfide and $TiO_2$ are present with a particle size of $\leq 0.6$ μm.

8. The sliding bearing of claim 7, wherein said zinc sulfide and $TiO_2$ are present with a particle size of $\leq 0.5$ μm.

9. The sliding bearing of claim 1, wherein a D50 value of said particle size of said zinc sulfide and said $TiO_2$ is between 200 nm and 500 nm.

10. The sliding bearing of claim 1, wherein said coating further comprises an additive of up to 10% by weight of carbon fibers or aramid fibers.

11. The sliding bearing of claim 1, wherein said coating has a thickness of 10 to 15 μm.

* * * * *